United States Patent

[11] 3,611,086

[72] Inventors Boris Mokrytzki
Highland Heights;
Dennis L. Szymanski, Willoughby, both of Ohio
[21] Appl. No. 2,780
[22] Filed Jan. 14, 1970
[45] Patented Oct. 5, 1971
[73] Assignee Reliance Electric Company

[54] INTEGRAL CARRIER RATIO INVERTER
29 Claims, 12 Drawing Figs.
[52] U.S. Cl. .................................................. 318/227,
318/230, 318/231, 321/5, 321/9 A, 321/9
[51] Int. Cl. ............................................ H02p 5/40,
H02m 7/52, H02m 1/08
[50] Field of Search .......................................... 321/5, 9;
318/227, 230, 231

[56] References Cited
UNITED STATES PATENTS
| | | | |
|---|---|---|---|
| 3,416,057 | 12/1968 | Froyd et al. ..................... | 318/227 |
| 3,423,662 | 1/1969 | Schlabach et al. ............ | 321/5 |
| 3,509,440 | 4/1970 | Johnston ..................... | 318/227 |
| 3,512,067 | 5/1970 | Landau ..................... | 321/5 X |

Primary Examiner—William H. Beha, Jr.
Attorney—Woodling, Krost, Granger and Rust ABSTRACT: A pulse width modulated inverter is described wherein an integral ratio carrier is used, the carrier frequency dictating the on and off periods of thyristors in the inverter system and the modulation frequency on the carrier is the fundamental output frequency of the inverter determining the speed at which a motor connected to the inverter will run. A control signal having a variable maximum amplitude establishes a variable and high clock frequency which varies directly with the control signal. A frequency divider divides this clock frequency into a plurality of output signals each being a predetermined multiple or ratio of the modulation frequency. A carrier range switch means is a selecting means connected to different outputs of the frequency divider to be responsive to different outputs of the frequency divider to be responsive to different frequency ratios and to pass a selected signal to carrier generator means. The carrier generator output is applied to an integrator to develop an inverter thyristor gating signal. This controls the conduction periods of the thyristors to establish the modulation frequency output of the inverter. Synchronizing means is provided to establish changing from one frequency ratio to another at a time when the output of the carrier generator integrator is at zero and at a time when the frequency divider outputs are zero, thereby to minimize current surges in the output of the inverter.

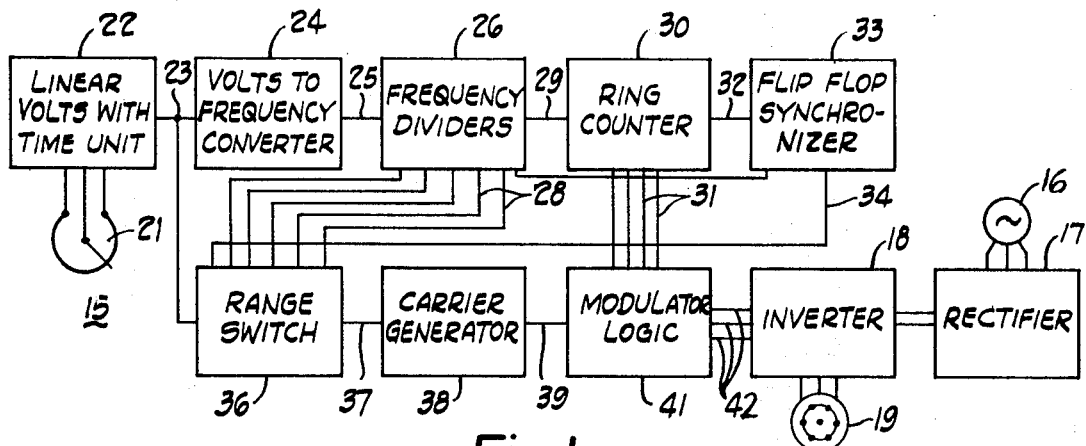
Fig. 1
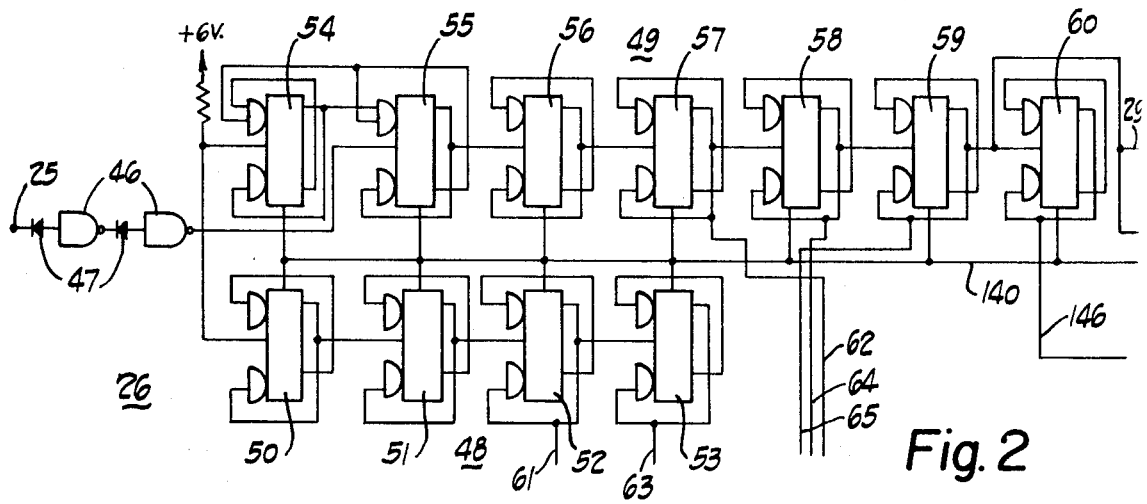
Fig. 2
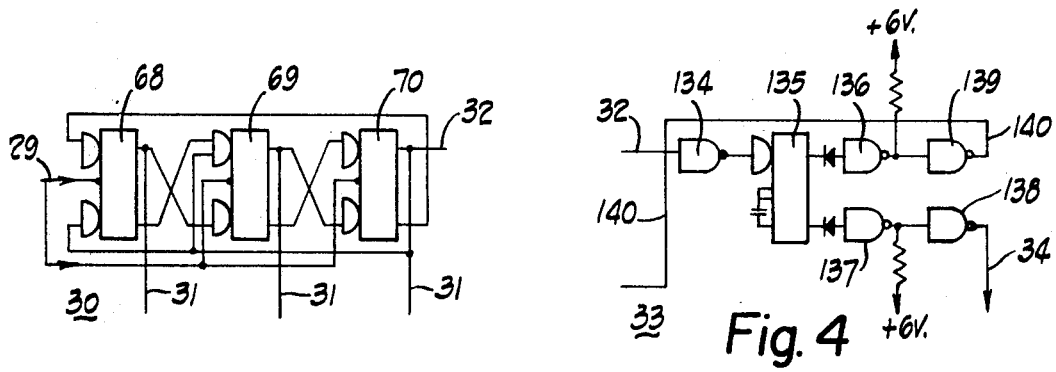
Fig. 3
Fig. 4
INVENTORS.
BORIS MOKRYTZKI
DENNIS L. SZYMANSKI
BY
ATTORNEYS.

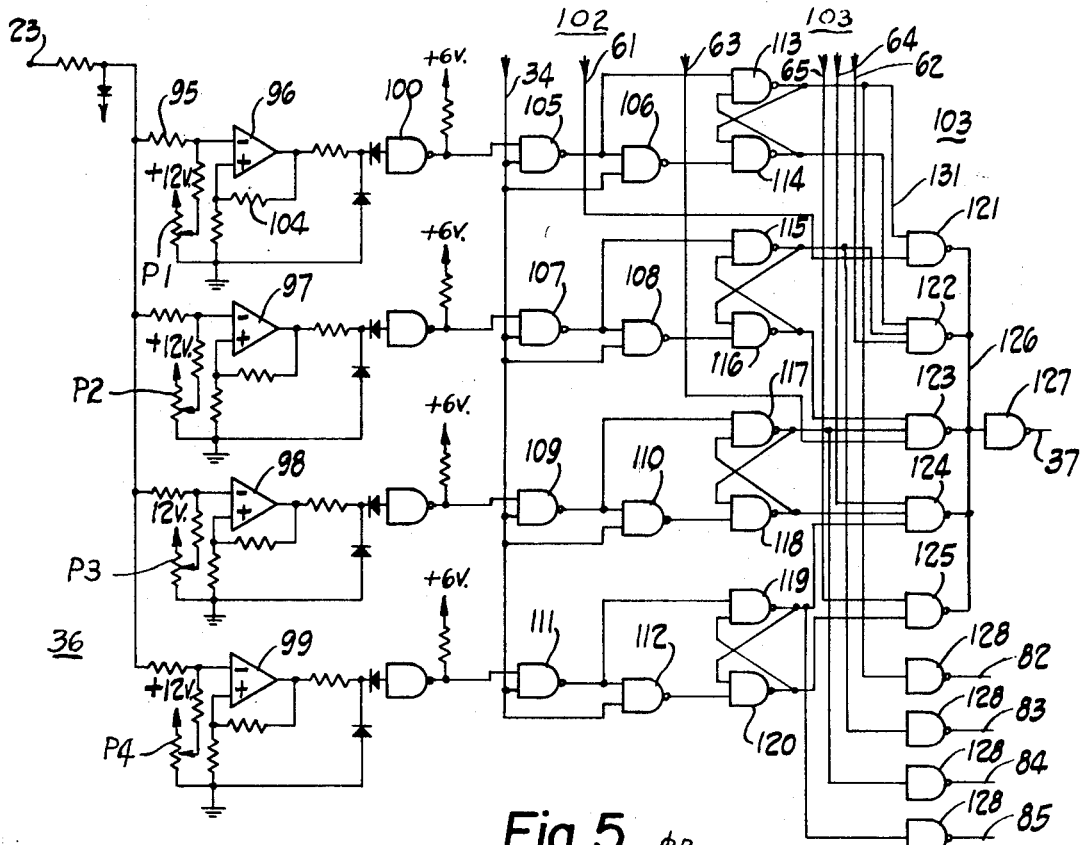
Fig. 5
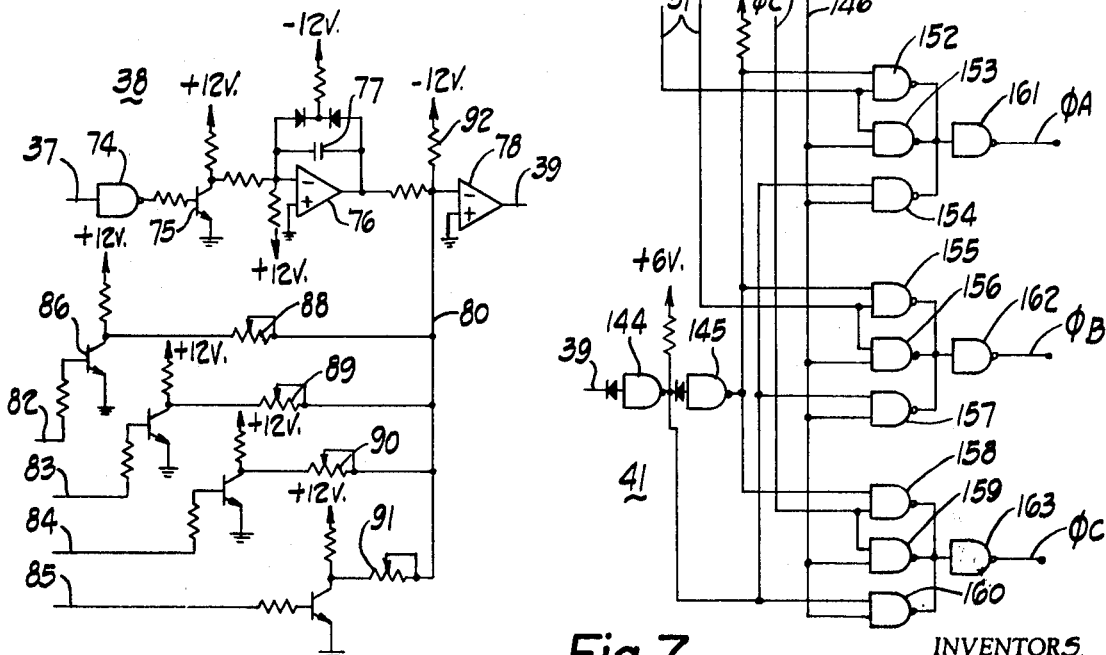
Fig. 6
Fig. 7

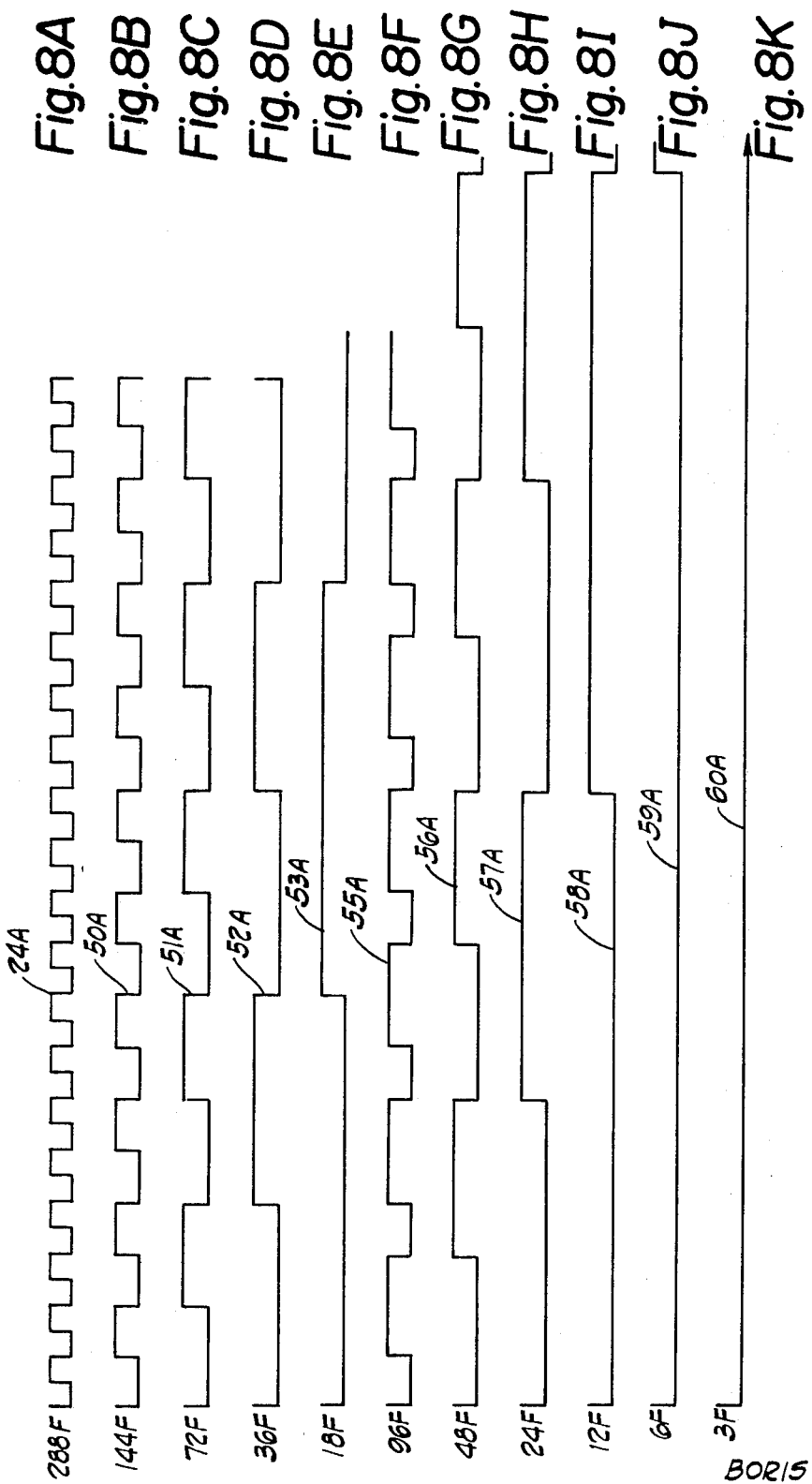

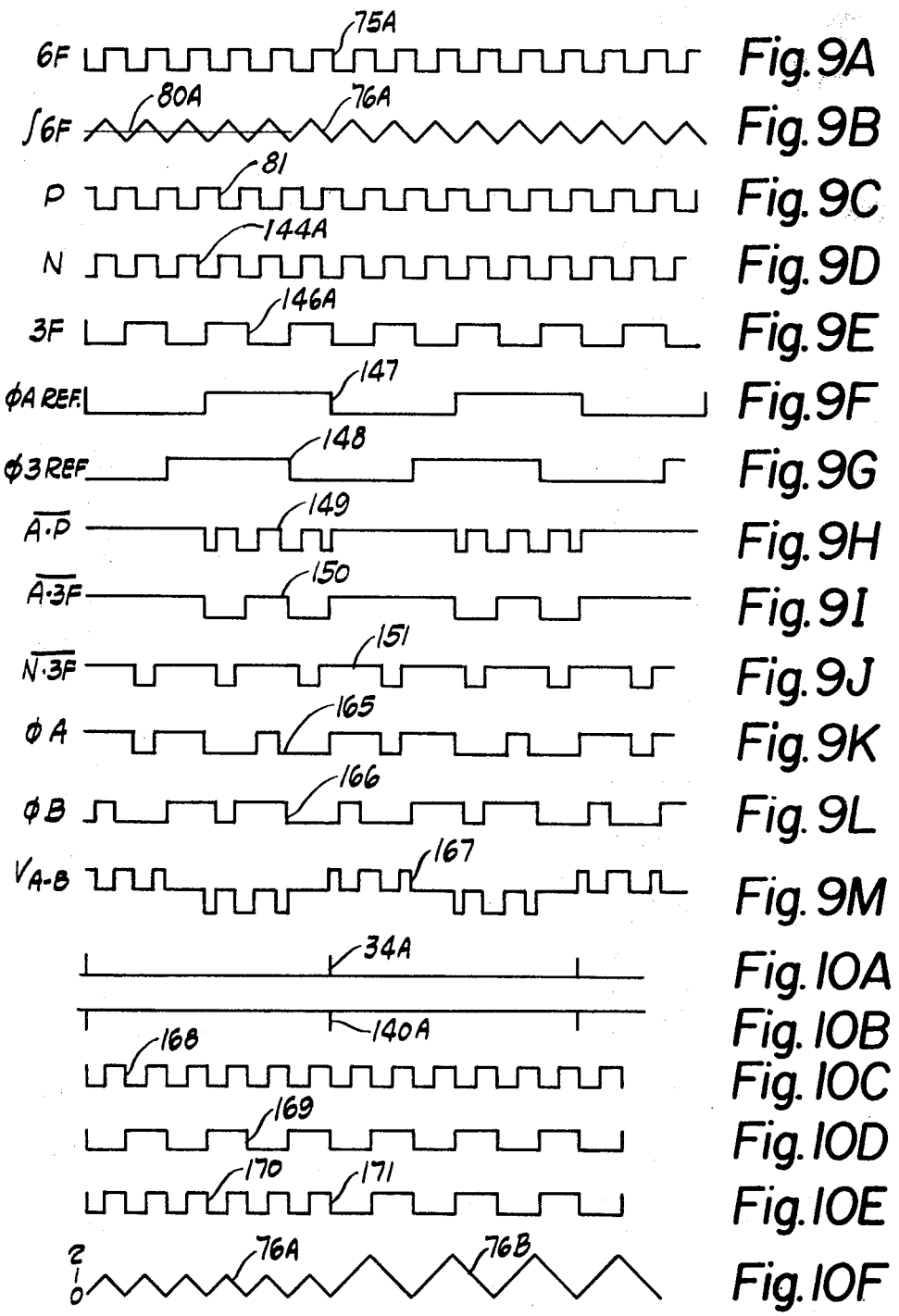

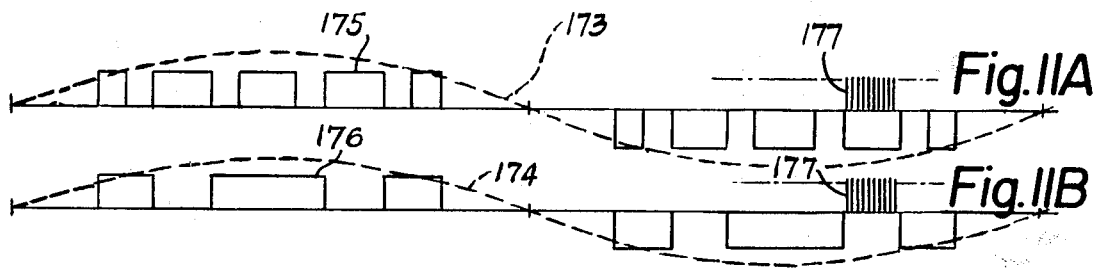
*Fig.IIA*
*Fig.IIB*
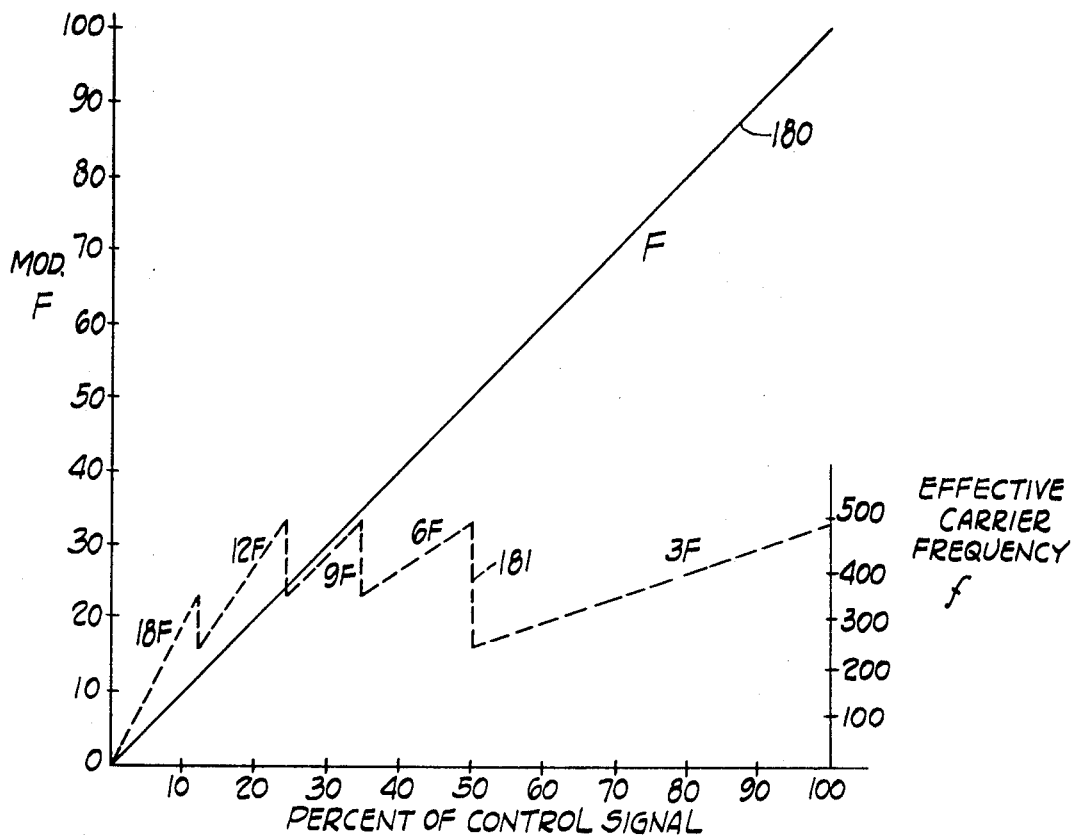
Fig. 12

INTEGRAL CARRIER RATIO INVERTER

BACKGROUND OF THE INVENTION

The performance of an alternating current dynamoelectric machine such as an induction motor or synchronous motor throughout its speed range is governed by the switching of the inverter power supply. The technology of today has demonstrated that the pulse width modulated inverter can obtain the most dynamic response from the AC machine. Although the induction motor is a very rugged device, its performance is affected seriously by harmonic interactions and in particular by any unwanted DC components or instantaneous variations in volts per Hertz. It has been observed that when motor performance is poor at least one of the above situations has been identified as the cause. With further study it has been found that these poor motor performance conditions occur when the ideal control circuit wave form cannot be resolved by the power circuit because of the physical limits inherent in the inverter. The limitations referred to are various circuit time constants and the nominal circuit jitter. If and when a pulse command of less time is called for than the inverter can produce, the harmonic content of the inverter output changes radically and speed variations of the motor result. The other case of DC in the output occurs when circuit jitter causes a pulse to jump in and out of the wave forms at random resulting in a DC component to be injected into the AC machine.

If the carrier frequency is not a multiple of the modulation frequency, one of the waves appears to drift past a particular point in the half cycle of the other, as viewed on an oscilloscope, giving rise to phase shifts in the output frequencies relative to the reference or input. The phase shifts vary as a function of time giving rise to undulations or beats in the output, which when applied to AC motor drives produces undulations or instabilities in speed and torque. This will result in rough motor performance, harmonic content changes and often large transient currents which may cause inverter failure.

Accordingly, an object of the invention is to provide an inverter control circuit which establishes the modulation frequency as an integral ratio of the carrier frequency.

Another object of the invention is to provide a pulse width modulated inverter wherein an integral ratio carrier system is used to eliminate undesirable AC motor performance.

Another object of the invention is to provide a pulse width modulated inverter with the modulation frequency being an integral ratio of the carrier frequency and switching from one integral ratio to another to maintain optimum inverter performance throughout a wide range of motor speeds.

Another object of the invention is to provide an integral ratio carrier inverter system wherein the ratio of carrier modulation frequency is switched automatically during dynamic changes of motor speed at synchronized times to avoid damaging current pulses in the output of the inverter.

Another object of the invention is to provide an integral ratio carrier inverter wherein different integral ratios of carrier frequency are generated and particular ones are selected to give optimum performance of the inverter depending upon the modulation frequency and the shifting between the various ratios is synchronized to minimize variations in the output current.

SUMMARY OF THE INVENTION

The invention may be incorporated in an integral ratio carrier pulse width modulated inverter system, comprising in combination, a variable control signal, ratio generating means generating a plurality of output signals at frequencies having an integral ratio with respect to the inverter output or modulation frequency, carrier generator means having an output of variable frequency, means dependent on said carrier generator means output to develop an inverter gating signal, and means selecting one of said different output signals of said ratio generating means in accordance with said control signal and applying same of said carrier generator means.

The inverter system of the present invention provides establishing the carrier as an integral multiple of the modulation frequency which is the fundamental output frequency of the inverter. By this means the output of the inverter is stabilized without the need for other means of synchronization. Choosing a particular and proper ratio can control the harmonics and eliminate excessive currents. For example, at times even ratios are undesirable because they produce even harmonics in the output resulting in asymmetry with respect to the positive and negative half cycles. Furthermore, for three phase systems, triple multiples of the fundamental must be used to prevent discrepancies between phase voltage, etc. For wide range variable frequency operation, using this technique, as the fundamental frequency is reduced, the carrier and output harmonic frequencies are lowered proportionately. This makes it more difficult for the reactances of the motor or load to filter or smooth the harmonic currents. Hence, to keep the effectiveness of these reactances as filters, it may be necessary to adjust or switch the ratio to higher and higher values as the modulation frequency is lowered. The present invention accomplishes this function.

Our inverter provides variable output frequency and voltage through pulse width control of the pulses which make up the output voltage of the inverter. As the voltage and frequency are reduced the harmonic content of the output wave relative to the fundamental frequency content increases. To reduce the amount of lower multiple harmonics in the output one can increase the number of pulses constituting the individual cycles of the fundamental or modulation frequency. We have found that if a carrier ratio shift or change from one number of pulses to another number of pulses is made at the beginning of a modulation cycle on one phase in a three phase inverter, that as long as the final fundamental voltage component of the output frequency is close to the original fundamental voltage component, there will be no significant change in inverter output or motor speed. Hence our inverter is set up to make changes in number of pulses per modulation cycle at certain frequencies and at certain voltage ratios where this current disturbance can be minimized.

The present invention accomplishes this by use of a reference voltage and of a voltage to frequency converter counting down from a rather high clock frequency to the fundamental output or modulation frequency. This counted down signal is capable of giving us both a fundamental frequency and a higher carrier frequency, and, automatically, since this is a dividing circuit various ratios of carrier to fundamental are available.

To actually provide gating signals to the thyristors in a three phase power inverter, we react together the modulating signal and a three phase wave pattern of some sort, actually comparing amplitudes of each and turning on and off various power thyristors in accord with the relative amplitudes of the carrier and the modulation signal. To make this determination the two signals are compared in a comparator.

When we wish to control pulse width of the inverter output and thus voltage, we change the relative amplitude of the two signals going into the comparator.

When we wish to change the number of pulses in each cycle we change at a shift point the carrier frequency ratio relative to the fundamental wave pattern, maintaining its integral ratio and controlling the amplitude of the new pattern, maintaining its integral ratio and controlling the amplitude of the new carrier relative to the old carrier signal so that the output fundamental voltage is the same for both carrier ratios. Furthermore, we make the change and coordinate it with the positive-negative or negative-positive transition on any one phase, the other phases basically being coordinated at the same time. It will be noted that a three phase inverter consisting of only three switching networks operates by one phase affecting the other two phases.

Certain ratios of carrier to fundamental frequency will give unsymmetrical waves for the three separate phases. It is desirable to have these the same although not always essential. The preferred ratios are thus multiples of three times the fundamental.

Other objects and a fuller understanding of the invention may be had by referring to the following description and claims, taken in conjunction with the accompanying drawings.

BRIEF DESCRIPTION OF THE DRAWINGS

FIG. 1 is a block diagram of a preferred embodiment of the invention;

FIG. 2 is a schematic diagram of the frequency divider of FIG. 1;

FIG. 3 is a schematic diagram of the ring counter of FIG. 1;

FIG. 4 is a schematic diagram of the flip-flop synchronizer of FIG. 1;

FIG. 5 is a schematic diagram of the range switch of FIG. 1;

FIG. 6 is a schematic diagram of the carrier generator of FIG. 1;

FIG. 7 is a schematic diagram of the modulator logic of FIG. 1;

FIGS. 8, 9, 10 and 11 are a series of voltage wave forms explaining the invention; and FIG. 12 is a plot of modulation frequency versus control signal illustrating the operation of the inverter circuit.

DESCRIPTION OF THE PREFERRED EMBODIMENT

FIG. 1 shows a preferred embodiment of the invention showing an inverter system 15 operable from an AC source 16 through a rectifier 17 and a power inverter 18 to load 19 shown as an AC motor. The AC source 16 may be a conventional 60 H2., 460 volt source, for example. The entire inverter system 15 includes the control system for the inverter 18 and this control system includes a speed control in the form of a potentiometer 21 supplying a signal for desired motor speed to a linear volts with time unit 22. This unit 22 has an output voltage which linearly increases in magnitude, either positive or negative, at a controlled variable rate to a limit value as set by the potentiometer 21. There may be a feedback from the motor 19 to potentiometer 21 to affect this control signal appearing on the output channel 23. The slope of this initial portion wherein the voltage is linear with time, is variable to control the rate of acceleration of the motor. The limit value or the variable maximum amplitude of the signal on the output 23 establishes the ultimate speed of the motor 19. Such LVTU is commercially available as Reliance Electric Company Part No. 0-49005-5.

This control signal on channel 23 is applied to a volts to frequency converter 24 which converts this input voltage into a pulse output of variable frequency. The frequency output is directly and linearly proportional to the voltage input. Such a converter is available as Reliance Electric Company Part No. 0-51814-1. The output of converter 24 is applied via channel 25 to a frequency divider 26. Broadly the converter 24 and the frequency divider 26 may be considered as a ratio generating means which generates a plurality of output signals on channels 28 at frequencies having an integral ratio with respect to the modulation frequency. The modulation frequency is the fundamental output frequency of the inverter 18 which determines the speed at which the motor 19 will run. The frequency divider 26 also has an output channel 29 at a lower frequency, in this case 6F or six times the fundamental or modulation frequency to a ring counter 30. This ring counter 30, in the case of a three phase motor 19 is a six-step ring counter to develop the basic six-step waveform or thyristor firing pattern required for a three phase output of the inverter 18 to the motor 19. This output appears on channels 31. The ring counter 30 also has an output on channel 32 to flip-flop synchronizer 33 at the modulation frequency F. This synchronizer 33 has an output on a channel 34 applied to a range switch means 36 at this same modulation frequency F to synchronize the times of shifting between carrier ratios, as explained below. A carrier generator 38 generates and shapes a carrier on an output channel 39 and receives an input on channel 37 from the range switch 36. The range switch selects the range of the carrier frequency to be within upper and lower limits for optimum operation of the inverter system 15.

The maximum carrier frequency determined by the range switch 36 will be in accordance with the minimum pulse width times. This is determined by the turnoff time of the thyristors used in the power inverter 18 which is similar to the deionization time of gas thyratrons. The minimum carrier frequency in the frequency range passed by the range switch 36 is determined by proper performance of the motor 19 so that proper filtering or smoothing is achieved by the reactance of the motor.

A modulator logic circuit 41 is supplied with the shaped carrier on the channel 39 and is also supplied with the basic six-step waveform, for three phase motor operation, from the output channels 31 of the ring counter 30. The modulator logic circuit 41 causes proper thyristor gating signals to appear on the output channels 42 to properly gate the thyristors in the power inverter 18 at the proper times to establish a modulated carrier wave output from the inverter to the motor 19. The speed control potentiometer 21 thus establishes a control signal which smoothly and continuously increases from a preset minimum to a preset maximum and this establishes a smoothly and continuously increasing modulation frequency so that the motor will smoothly accelerate to any predetermined speed within this range. This modulation frequency control is along a first path through the ring counter 31. Throughout this speed range the range switch 36 is a means to select any one of several ranges of carrier frequencies with each carrier frequency having an integral ratio with respect to the modulation frequency. The changes are made automatically and while the moor is running and in fact while the motor is either accelerating or decelerating. The action is like an automatic transmission in an automobile smoothly changing the gear ratio to increase the speed of the automobile while the engine accelerates in sequence through each of the gearshift ranges. Thus there is a dynamic changing in ratios of the carrier to the modulation frequency. This carrier frequency control is along a second path including the range switch 36 and carrier generator 38.

There are many different ways in which the basic concept of the inverter system of FIG. 1 may be accomplished and FIGS. 2 through 7 show a preferred embodiment which is a circuit tried and proved operational and is merely one way of accomplishing this result. FIG. 2 illustrates one circuit for the frequency divider 26. This frequency divider 26 has an input on channel 25 through buffer amplifiers 46 to first and second series of flip-flops 48 and 49, respectively. The first series of flip-flops 48 scales down the frequency by a ratio of 1:2 in a sequence of steps. The input on channel 25 is termed a clock frequency coming from the volts to frequency converter 24. These may be clock pulses passed by the NAND gates and their input diodes 47. In this embodiment this clock frequency is 288F where F is the modulation frequency or fundamental output frequency of the inverter 18. Accordingly, in the first series 48 of flip-flops, the first flip-flop 50 in this first series has applied to it the clock frequency of 288F and has an output of 144F. The next flip-flop 51 has an output of 72F. The next flip-flop 52 has an output of 36F and the last flip-flop 53 in this series, has an output of 18F. These outputs are shown by curves 50A, 51A, 52A and 53A, respectively in FIG. 8. Curve 24A in FIG. 8A shows the output of the volts to frequency converter 24. The second series of flip-flops 49 again has the clock frequency of 288F applied to it but the first and second flip-flops 54 and 55 in this second series, scale down the clock frequency by a ratio of 1:3 and therefore flip-flop 55 has the output frequency of 96F. From this point on, all the flip-flops 56, 57, 58, 59 and 60 in this second series of flip-flops 49 scale down the applied frequency by ratios of 1:2 and hence have output frequencies of 48F, 24F, 12F, 6F and 3F, respectively. These outputs are shown by curves 55A through 60A in FIG. 8. This frequency divider 26 plus the clock frequency generator which is the volts to frequency converter 24 is a ratio generating means generating a plurality of output signals on channels 28 at frequencies each having an integral ratio with respect to the modulation frequency F. The frequency of 36F appears on an output channel 61, a frequency of 24F appears on a channel 62, a frequency of 18F appears on a channel 63, a frequency of 12F appears on channel 64 and a frequency of 6F appears on channel 65. All of these channels 61–65 collectively form the output channels 28 as shown in FIG. 1 and are applied to the range switch 36 described below with respect to FIG. 5. The 6F frequency output from the flip-flop 59 is applied on output channel 29 to the ring counter 30, as shown in FIG. 1.

FIG. 3 shows schematically a circuit for the ring counter 30 which utilizes three flip-flops 68, 69 and 70 interconnected in a common configuration to form a ring counter generating pulses in sequence on the output channels 31 which lead to the modulator logic circuit 41. This is a typical ring counter wherein the pulses on the output channels 31 are 120 degrees apart in phase relative to the modulation frequency F. Accordingly there will be one output pulse on each of the output channels 31 for each sequence of six cycles of the 6F frequency applied on input 29 and thus at the output channel 32 a frequency of 1F will be applied to the flip-flop synchronizer 33 shown in FIG. 1 and also in FIG. 4. Combining the outputs of the ring counter on the channels 31 together with the 3F signal from the flip-flop 60 will result in an output from the modulator logic circuit 41 which requires the minimum number of power circuit switches of the thyristors in the inverter 18.

FIG. 6 shows schematically a preferred embodiment of the carrier generator 38. This carrier generator 38 is an operational amplifier integrator with a feedback arrangement such that the output will return to and start at zero at the beginning and end of each cycle. The input to the carrier generator 38 is on the channel 37 leading through a buffer amplifier 74 and a common emitter transistor 75 to an operational amplifier 76 having a feedback capacitor 77 so that it acts an an integrator. The input to the integrator 76 is a symmetrical square wave such as shown by curve 75A in FIG. 9A, and the output from this integrator 76 is a symmetrical sawtooth wave formed by isosceles triangles and illustrated by the curve 76A in FIG. 9B.

The amplitude of the integrator 76 is a function of the frequency and is allowed to vary accordingly because of its linear relationship to the symmetrical square wave input being integrated. For example, if the square wave frequency is $f$ and the integrator output amplitude is 1 unit, then at $f/2$ the amplitude output is 2 units, etc. This is because the rate of integration or slope is constant, and is shown by the curve 76A in FIG. 10F and the transition to the curve 76B wherein the frequency has been cut in half but the amplitude has been doubled.

An operational amplifier 78 connected to the output of integrator 76 acts as a comparator comparing the output of the integrator 76 with a reference level established on the conductor 80. This reference level is illustrated by a straight line 80A on the curve of FIG. 9B. When the reference level exceeds the peak amplitude of the triangular sawtooth wave, then an output is passed to the output channel 39. This is similar to a curve 81 shown in FIG. 9C. Since the amplitude and frequency of the carrier vary inversely with respect to one another, a simple scheme of comparing the variable carrier with a fixed reference level will achieve pulse-width modulation of the integral ratio carrier pulses and constant volts per Hz. control which results in constant torque operation of the motor 19. For one particular carrier ratio, as the speed potentiometer 21 is increased, this will increase the frequency of the integrator output as shown in FIG. 9B and this will decrease the amplitude of these triangular waves. In comparing this in the comparator 78 with the fixed reference 80A, it will be noted that the pulsed output at curve 81 will become wider and this will narrow the notches between the pulses in the final output wave of the power inverter 18 as shown in FIG. 9M. This increases the effective voltage as the frequency increases for proper motor operation, i.e. constant volts per Hz.

The carrier ratio will change as explained below and as this carrier ratio changes, to achieve constant volts per Hz. control, the reference level must also be proportionately changed. This assures the same volts per Hz. at the same modulation frequency F, but a different carrier ratio. Input channels 82, 83, 84 and 85 lead through transistors 86 connected as common emitter configuration to individual variable or selected fixed value resistors 88, 89, 90 and 91. The input channels 82–85 come from the output of the range switch 36 shown in detail in FIG. 5 and explained below. These input channels 82–95 each have a signal thereon dependent upon the particular carrier ratio selected and accordingly one or more of the rheostats 88–91 will be in the circuit on the reference line 80. The following Table I shows the relationship between several different frequencies in the entire circuit 15 merely as an example as one particular type of operation which has been tested and found satisfactory.

TABLE I

| Shift point | Max. LVTU | Clock 288F | Mod. F | Carrier $f$ rectified | IRC derectified | 4 pole motor speed |
|---|---|---|---|---|---|---|
| Start from rest | 1/2 volt | 2880 | 10 Hz. | 36F = 360Hz | 18F = 180Hz | 300 rpm |
| 1st shift point | 1 | 5760 | 20 | 36F = 720Hz | 18F = 360Hz | 600 rpm |
|  |  | 5760 | 20 | 24F = 480Hz | 12F = 240Hz | 600 rpm |
| 2nd shift point | 2 | 11520 | 40 | 24F = 960Hz | 12F = 480Hz | 1200 rpm |
|  |  | 11520 | 40 | 18F = 720Hz | 9F = 360Hz | 1200 rpm |
| 3rd shift point | 2.75 | 15840 | 55 | 18F = 990Hz | 9F = 495Hz | 1650 rpm |
|  |  | 15840 | 55 | 12F = 660Hz | 6F = 330Hz | 1650 rpm |
| 4th shift point | 4 | 23040 | 80 | 12F = 960Hz | 6F = 480Hz | 2400 rpm |
|  |  | 23040 | 80 | 6F = 480Hz | 3F = 240Hz | 2400 rpm |
| Top speed | 8 | 46080 | 160 | 6F = 960Hz | 3F = 480Hz | 4800 rpm |

From this Table I it will be noted that the fourth and fifth columns show that it is possible to have a modulation frequency F of 80 Hz. with a carrier ratio of either 12F or 6F. However, the amplitude of 6F integrated is two times that of 12F therefore the compared reference must be reduced to one-half at 12F compared to what it was at 6F to maintain the same volts per Hz. relationship for all practical purposes. It should be noted that there is a slight difference in harmonic and fundamental content between the two resulting waveforms, and slight trimming of the rheostats to adjust the reference level does eliminate any volts per Hz. transients when such a switch is made. The comparator 78 is actually comparing the value of the rheostats 88–91 whichever ones are in the circuit with the value of a resistor 92. As an example, resistor 92 may be made with a value of 1 unit of resistance, rheostats 88, 89 and 90 may have a resistance value of 6 units and rheostat 91 may have a value of 3 units. Then depending upon whether one, two, three or all four rheostats 88–91 are connected in the circuit, the value of resistance 92 is being compared with progressively lower and lower values of resistance and hence the reference level 80A continues to increase by steps as the modulation frequency increases.

The FIG. 5 shows a schematic diagram of a preferred embodiment of the range switch 36 which may be considered a detector of the carrier ratio or a band selector. The upper and lower limits for each integral carrier ratio band is determined by the inverter switching ability and by motor harmonic losses, respectively. The upper limit for an integral ratio carrier is limited to the safe maximum switching rate and the voltage output of the inverter 18 itself for a given range. A control signal which is directly proportional to the modulation frequency is applied on the channel 23. It is applied through isolating resistors 95 to operational amplifiers 96, 97, 98 and 99 which are prebiased at set switch points by settings on the potentiometers P1, P2, P3 and P4. Fixed resistance dividers may also be used. Potentiometer P1 may be set at the lowest value, for example, 1 volt as shown in this second column of Table I and potentiometers P2, P3 and P4 may be set at 2, 2.75 and 4 volts, respectively. This is a control signal or a command signal and it is some form of a logical control input through the range switch which is related to the modulation frequency, so that the particular carrier ratio is selected to keep the carrier frequency always within the upper and lower limits for the integral carrier ratio band. Each of these operational amplifiers 96-99 acts as a comparator comparing the input control signal with the preset bias. For example, when the input control signal exceeds the 1 volt bias on potentiometer P1 then there is an output from comparator 96. Likewise when the voltage of the input control signal exceeds 2 volts, 2.75 volts and 4 volts, then there is an output signal from the comparators 97, 98 and 99, respectively. Each of these outputs is passed through a NAND gate acting as a buffer amplifier and inverter, such as amplifier 100, is passed through a carrier band synchronizing circuit 102 to a ratio interlock circuit 103. This ratio interlock circuit 103 prevents the skipping or jumping of ratios; that is, they must follow in sequence in both increasing and decreasing frequency directions. Hysteresis on the operational amplifiers 96-99 is provided by the feedback resistors 104 which prevent oscillation around a switch point of the carrier.

The carrier band synchronizing circuit 102 and ratio interlock circuit 103 consist of a group of NAND gates. These are commercially available NAND gates. The carrier ratio band synchronizing circuit 102 includes NAND gates 105 through 112 with NAND gates 105 and 106 connected in sequence from the output of the comparator 96. A series of latch gates 113 through 120 are provided in the ratio interlock circuit 103. Also a series of five NAND gates 121-125 are connected in a wired OR configuration through the output channel 126 and inverter amplifier 127 inverts the output signal on this channel 126. A sync line or inhibit line 34 has an input from the flip-flop synchronizer 33, FIG. 1, and has an input to the second NAND gate is each of a series of four in the carrier band synchronizer circuit 102. Five other inputs are provided; namely, the channels 61-65 which are inputs from the ratio generator means or frequency divider 26. On these input channels 61-65 frequency ratios are provided corresponding to 36F, 24F, 18F, 12F, and 6F, respectively.

When starting the motor from rest, as shown in Table I, the carrier frequency ratio will be at the highest range or the highest ratio of carrier to modulation frequency as shown by column 5 of Table I. At the first shift point the comparator 96 will emit a signal which is passed through the buffer 100 and the NAND gates 105 and 106 to the NAND gate 114. The NAND gates 113 and 114 are cross-connected for a flip-flop and normally there is an input of a logic one condition on an input channel 131 of the NAND gate 121. For slow speed motor speed operations below the first shift point, this highest ratio of 36F for the carrier frequency will be controlling. This 36F signal comes in on the input channel 61 to the second input of the NAND gate 121. Accordingly this will be controlling and control the output of the NAND gate 121 between logic one and logic zero in accordance with the logic zero or logic one condition, respectively, on the input channel 61. Prior to the first shift point the following logic conditions exist: comparator 96 at logic zero, buffer 100 at logic one, gates 105, 106 and 113 at logic one output and gate 114 at logic zero output. Now at the first shift point the bias set point will be exceeded at comparator 96 and the comparator 96 will change state to that of logic one. That in turn changes the buffer 100 to a logic zero output. Assuming that the inhibit line 34 whose function will be described later switches to a logic one condition, the following will occur: gate 105 will remain at logic one, gate 106 will have both inputs at logic one causing its output to switch to zero condition. The logic zero applied to latch gate 114 will force its output to switch to logic one. When this occurs logic gate 113 will switch to logic zero because both its inputs are at logic one. This switching action can occur only when the sync line 34 is in a logic one state. As the control signal 23 increases, comparators 97 through 99 will perform in the same manner involving their respective gating channels in the presence of sync line 34 in the logic one state. The carrier ratios will change in the following sequence: 36F to 24F to 18F to 12F and to 6F and the operation is reversible, 6F to 12F etc. The logic gates 121 through 125 insure that the sequence of ratio changes both forward and reverse is maintained in the above sequence. The skipping of ratios is not permitted by the gates 121 through 125. It should also be noted that a shift sequence can be permitted in the following manner; that is, 36F to 24F and then back to 36F but a shift can only occur in the presence of a logic one condition on sync line 34.

The synchronizing of shifting between integral ratio carrier bands is the key to changing carrier bands without adverse motor performance and possible inverter failure. This is synchronizing the ratio change at a time when the integrator 76 is at zero and also at a time when all of the flip-flops in the frequency divider 26 have gone to zero. This novel function is accomplished by the flip-flop synchronizer 33 shown in FIG. 1 and also in FIG. 4. The input to this flip-flop synchronizer 33 is on the channel 32 and passes through a buffer 134 to a one-shot multivibrator 135. This one-shot multivibrator has two outputs through buffers 136 and 137. The output of 137 passes through a power gate 138 to the sync channel or inhibit line 34. The output on this sync channel 34 may be pulses of very short duration such as 1 microsecond occurring at the rate of one per cycle of the modulation frequency F. This may be considered an inhibit line to control the carrier ratio band synchronizing circuit 102 of FIG. 5. Also the flip-flop synchronizer 33 has another output through a buffer 139 to a channel 140 which is a flip-flop reset synchronizer line. Short duration negative pulses, for example, of 1 microsecond duration appear on this line 140 at the modulation frequency F. The flip-flops in the frequency divider 26 may not be in the same step of operation when the circuit is first turned. The flip-flop synchronizer 33 at the end of one cycle of the modulation frequency F will generate a synchronizing pulse on line 140 which is applied to all of the counter reset lines in the frequency divider 26 and this puts the flip-flops 50-60 in step. This function is needed only once per turn-on of inverter 15, but it is beneficial to have this occur every cycle of the modulation frequency just in case noise causes a flip-flop to get out of step. The consequence of this function defines a point which has in common: the zero point of the carrier and a null point where the inverter 18 does not have to perform any power switching of the thyristors. The importance of this fact is that the motor 19 experiences little or no disturbance in load current due to carrier ratio switching at a given modulation frequency.

When a band switch from one carrier ratio to another is called for it can occur only at the beginning of a modulation cycle when the inhibit line or sync channel 34 allows the interlocking switching logic in circuit 102 to function. The time that actual carrier ratio switch may take place in the integral ratio carrier system is in the range of 1 to 3 microseconds. This is approximately two orders of magnitude greater than the inverter 18 can complete a power switch of the thyristor therein. As far as the inverter or motor are concerned, they remain in the same state, before, during and after the carrier ratio change. Once a ratio change is accomplished, and so long as the volts per Hz. remains constant, motor disturbance for all practical purposes is small even though the harmonic content of the modulation frequency wave has changed.

The carrier band synchronizer circuit 102 operates in the following fashion. Normally there is a zero output on the inhibit line 34 and because this is an input to the NAND gate 106 there is a normal logic one output condition of this NAND gate 106. This establishes the aforementioned logic zero output for NAND gate 114 and the logic one output of NAND gate 113. Now while the motor is operating at the lowest speed; namely, the highest frequency ratio of 36F, and before the first shift point, there is a zero output from the comparator 96. The buffer 100 inverts this signal for a logic one condition input to the NAND gate 105. The normal zero logic condition on inhibit line 34 keeps the output thereof at logic one. A zero logic condition on the inhibit line keeps the output of NAND gate 106 at logic one and the output of NAND gate 114 at logic zero because the output of NAND gate 113 is at the normal logic one condition. Now when an inhibit pulse comes along the inhibit line 34, but no shift signal has been received, then the following changes take place. This logic one condition now appears on both inputs of NAND gate 105 and the output goes to logic zero. This keeps the output of NAND gate 106 at logic one even though the other input of NAND gate 106 has gone to logic one because of the pulse on the inhibit line 34. Thus there is no change in the output of gate 106 nor of the flip-flop 113–114.

However, when a shift signal is given by an output from the comparator 96, the output condition goes from logic zero to logic one. The output of the buffer 100 goes from logic one to logic zero but this alone keeps the output of the NAND gate 105 at logic one condition. Now, however, when the pulse comes along the inhibit line 34, this is a logic one condition and two logic one conditions to the input of NAND gate 106 change the output from logic one to logic zero condition. This changes the output of NAND gate 114 from logic zero to logic one driving NAND gate 113 to logic zero output condition. Because of the cross connection of the flip-flop this zero input to the NAND gate 114 keeps its output at a logic one condition. Accordingly thereafter the output of NAND gate 113 remains at zero so long as the speed reference potentiometer calls for a speed higher than established by the first shift point. After the first inhibit pulse has passed, the inhibit line 34 again has a logic zero condition as does the output of buffer 100 so the NAND gate 105 remains at logic one condition, and the flip-flop 113–114 is latched up with a zero output condition of the flip-flop 113. A similar sequence takes place for each of the other latch gate pairs 115–116, 117–118 and 119–120, at their respective switch points.

FIG. 5 also has outputs from the NAND gate 113 through a buffer amplifier 128 to the channel 82 leading to the reference level varying means of FIG. 6. NAND gate 115 also has an output though a similar buffer to channel 83 and NAND gates 117 and 118 have outputs through similar buffers through channels 84 and 85, respectively. It will be observed that the output of NAND gate 113 is normally a logic one and changes to logic zero only upon a ratio change. Accordingly, the inputs to the buffer amplifiers 128 are normally at logic one and because these are NAND gates the output is normally at logic zero. Thus at the first shift point channel 82 changes to logic one and at each succeeding shift point the succeeding channels 83, 84 and 85 progressively change to a logic one condition. As described above for the circuit of FIG. 6, this will successively remove from the reference level circuit the resistors 88, 89, 90 and 91. This successive deparalleling of these resistors progressively increases the effective resistance of the paralleled combination to increase the reference level by steps. This is a change in relative amplitude between the carrier generator and the reference and whereas it is accomplished by changing the reference level it could just as easily be accomplished by maintaining the reference level constant and changing the amplitude of the carrier generator.

FIG. 7 shows schematically a preferred embodiment of the modulator logic circuit 41 which has an input on channel 39 from the carrier generator 38. A NAND gate 144 reverses the logic condition of this output and hence is called an N for the negative of the output condition of the comparator 78. Another NAND gate 145 again reverses this logic condition and hence is a P or positive output condition of the comparator 78. This N output of the NAND gate 144 is shown in curve 144A of FIG. 9D. The P output condition of the NAND gate 145 is the same as N except it is inverted, and is shown by the curve 81 in FIG. 9C. A 3F output comes from the frequency divider of FIG. 2 on channel 146 and this is shown by curve 146A in FIG. 9E. The phase A reference of the AC source 16 is shown by a curve 147 in FIG. 9F. Phase B reference of the AC source 16 is shown by curve 148 in FIG. 9G. By Boolean logic it can be shown that the phase A voltage to be applied by the inverter 18 to the motor 19 may be represented by $\overline{A \cdot P} + \overline{A \cdot 3} + \overline{N \cdot 3F}$. The $\overline{A \cdot P}$ is represented by a curve 149 in FIG. 9H. The $\overline{A \cdot 3F}$ is represented by a curve 150 in FIG. 9I. The $\overline{N \cdot 3F}$ is represented by a curve 151 in FIG. 9J. The modulator logic circuit 141 performs this Boolean logic of combining these various waveforms by the NAND gates 152 through 163. The NAND gates 152, 153 and 154 are connected in a wired OR configuration to the NAND gate 161 for developing the phase A logic command signal for firing the thyristors in the inverter 18. Such signal appears on the phase A output channel which is the output of the NAND gate 161. To accomplish this logic function the NAND gates 153 and 154 have inputs from the channel 146. Also NAND gates 152 has P function input and 154 has N function input and the phase A output channel 31 from the ring counter 30 is applied to the group of NAND gates 152 and 153 to sequentially trigger the gates for the phase A thyristor switching. For phase A, as shown by curve 165 in FIG. 9K, this is a combination of the curves 149, 150 and 151 of FIGS. 9H, 9I and 9J. The phase B curve 166 shown in FIG. 9L is obtained in a similar fashion from the NAND gates 155, 156, 157 and 162, using the Boolean logic $\overline{b \cdot P} + \overline{B \cdot 3F} + \overline{N \cdot 3F} =$ Phase $B$. Similarly phase C equals $\overline{C \cdot P} + \overline{C \cdot 3F} + \overline{N^{nq} 3F}$. The voltage A to B, that is, line to line voltage on the motor 19, is shown by a curve 167 in FIG. 9M and this is the instantaneous voltage appearing between the curve 165 and 166. The other voltages B to C and C to A are similar, but phase shifted 120° and 240° from voltage A to B.

FIG. 10A shows a curve 34A of the narrow width pulses occurring on the inhibit line 34 and FIG. 10B shows a curve 140A of the narrow pulses occurring on the flip-flop reset synchronizer line 140. FIG. 10C shows a curve 168 of the 12F carrier from the frequency divider 26. FIG. 10D shows a curve 169 of the carrier 6F from the frequency divider 26. FIG. 10E shows the transition at the time of the inhibit pulse on the curve 34A from the 12F carrier to the 6F carrier on a curve 170 at a transition point 171. This will be at the output channel 37 of the range switch 36. Accordingly the curves 76A and 76B in FIG 10 show this transition in the output of integrator 76 of the carrier generator 38 shown in FIG. 6. Referring to Table I, the fifth column refers to the carrier frequency $f$ rectified whereas the sixth column refers to the carrier $f$ or integral ratio carrier derectified. It will be recalled that a full wave rectifier doubles the output frequency; that is, a full wave rectifier operating on a 60Hz. source has an output at 120Hz. Because the carrier generator includes the integrator 76, it operates on only one side of the zero voltage level, thus is a rectified system. Later the thyristor gating or conduction signal for the power inverter 18, which is generated in the modulator logic circuit 41, derectifies this rectified signal from the integrator 76. At such time the carrier frequency is cut in half and this is the explanation for the fifth and sixth columns of Table I.

The above description describes an integral ratio carrier circuit that was designed, built and tested with circuit functions such that:

a. An integral number of symmetrical and modulator synchronized pulses in each half cycle are maintained regardless of noise or jitter in the various range bands.

b. The pulse width times are constrained to values the power inverter 18 can resolve.

c. Proper volts per Hz. relationship is controlled.

d. The detection and synchronization of switching of integral ratio carrier bands without disturbance of motor performance.

e. The minimum number of switches of the thyristors in the power inverter 18 is established for pulse-width modulated six-step inverter operation.

f. Superior performance of the motor 19 is achieved in regard to stability of operation compared to a resynchronized carrier system.

The above invention achieves an integral ratio carrier inverter wherein the carrier ratios are changed dynamically; that is, during motor operation to operate the inverter at an efficient carrier rate throughout a wide speed range of the motor 19.

FIG. 11A illustrates the transition in the carrier frequency at a shift point. Curve 173 is a sine wave although a sine wave does not appear in the circuit, this illustrates the simulated sine wave achieved by the pulse-width modulated output such as curve 167 in FIG. 9M of the line to line voltage. This is the modulation frequency output for example at 80 Hz. Curve 174 in FIG. 11B is the same 80 Hz. modulation frequency output. The pulses 175 in FIG. 11A illustrate the effective carrier frequency of 12F, or 6F after it has been derectified. The pulses 176 in the FIG. 11B illustrated the effective carrier frequency of 6F, or 3F after derectification, after the shift has taken place. There are fewer carrier pulses but the modulation frequency of 80 Hz. remains the same. Also, it will be noted that the volt-seconds or volts per Hz. are constant. The clock frequency pulses are illustrated at 177 in these curves of FIGS. 11A and 11B. Such clock frequency in this case would be 23040, from Table I. FIG. 12 illustrates a curve 180 which is a straight line and is a plot showing relationship between the modulation frequency F shown on the ordinate, as plotted against percent of the control signal on the control channel 23 plotted along the abscissa. This shows the linear relationship between this control signal on channel 23 and the modulation frequency F. FIG. 12 also shows another curve 181 showing how the carrier frequency $f$ varies with the percent of the control signal, and shows that this carrier frequency $f$ is maintained within a fairly narrow band of about 240 to 500 Hz. This is also confirmed by the sixth column of Table I above. The only exception is starting at 10 Hz. wherein increased motor losses can be tolerated for a short period of time if the motor is normally operated in this condition for only short intervals of time. If the motor is to be operated at 10 Hz. for long periods of time, a higher carrier ratio may be selected. This curve 181 shows that the carrier frequency changes in ever-narrowing bands as the modulation frequency F decreases. Note that by taking more steps in the curve of 181, the carrier frequency excursions can be lessened or the range of operation may be extended.

The above-described invention shows a means for generating the various carrier ratios, each in integral multiple of the modulation frequency and how they may be selected at the appropriate time by the range switch 36 to keep the carrier frequency within optimum operating conditions of the inverter 18. Also a means for synchronizing the transition from ratio to ratio is provided to minimize the disturbance to the motor 19. This is most important where the motor is driving a sensitive load, for example, a nylon filament being carried out of an extruder, where sudden jumps in the motor performance could break the filament. Upon examining FIG. 1 it will be observed that there is a first and second path between the control signal at the speed potentiometer 21 and the inverter 18. The first path establishes the fundamental or modulation frequency and leads through the frequency divider 26 and ring counter 30 to the modulator logic 41. This ring counter is required for a multiphase system in order to change from a single phase control signal to the control of the polyphase motor 19. As such the ring counter may be considered as pattern generating means to generate a firing or conduction pattern for the thyristors or other switching devices in the inverter 18. In this preferred embodiment for a three-phase motor the pattern being generated is a firing or gating pattern for three phases each 120° apart. This pattern generating means generates the basic modulation or fundamental frequency at which the motor 19 will operate. This is shown in the next-to-last column of Table I.

The second path for signals shown in FIG. 1 is a path for the carrier frequency. This second path includes the frequency divider 26, the range switch 36 and the carrier generator 38. The frequency divider 26, because it is counting down from the high clock frequency, automatically has within it an entire series of different frequencies each of which is an integral multiple of the modulation frequency. The range switch 36 switches between carrier ratios in accordance with the control signal from potentiometer 21 or in other words in accordance with the clock frequency from converter 24. These two paths are combined at the modulator logic circuit 41 and thus control the gating of the thyristors in the inverter 18. There is an interaction between the carrier and modulation frequencies to control this thyristor gating signal. In the circuit of FIG. 6 it will be noted that the carrier generator integrator 76 is being compared with the reference on line 80 at the comparator 78. This provides variable width pulses on the output of the comparator see FIG. 9C. When this signal is passed through to the modulator logic circuit 41, it is then again compared with the signal representing the modulation frequency. Accordingly basically what is being done is that a carrier and a modulation signal are being compared and jointly control the thyristor gating signals. Also at the shift points, shifting between different carrier ratios, the change in the reference level on line 80 establishes that there is a relative adjustment between the amplitude of the modulation and carrier frequencies so that the fundamental component of the inverter output at the modulation frequency has a minimum variation at this time of carrier ratio change.

The synchronization means establishes a synchronization between the carrier and modulation signals at a neutral point or at a zero crossover point. In the preferred embodiment this is at the point where the integrator 76 output has returned to zero. Also all of the flip-flop in the frequency divider 26 have returned to zero.

It will be noted that the rectifier 17 supplies a fixed input voltage to the inverter 18 and that this is a pulse width modulated inverter 18 as distinguished from a variable voltage input inverter which relies upon a variation of input voltage for a variation of output voltage. The fixed input voltage in this case might also be variable without eliminating the advantages obtained by the present invention.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. An integral ratio carrier pulse width modulated inverter system, comprising in combination;
   a variable control signal,
   ratio generating means generating a plurality of output signals at frequencies having an integral ratio with respect to the inverter output or modulation frequency,
   carrier generator means having an output of variable frequency,
   means dependent on said carrier generator means output to develop an inverter gating signal;
   and means selecting one of said different output signals of said ratio generating means in accordance with said control signal and applying same to said carrier generator means.

2. An inverter system as set forth in claim 1, wherein said control signal has a variable maximum DC amplitude.

3. An inverter system as set forth in claim 2, wherein said control signal includes a linear volts with time unit having a linear rate of voltage amplitude increase to a limit value, said limit value being the variable maximum amplitude and establishing the selection of the frequency ratio.

4. An inverter system as set forth in claim 3, including a volts-to-frequency converter connected to said linear volts with time unit.

5. An inverter system as set forth in claim 1, wherein said selecting means includes a plurality of gating means each individually gated by different maximum amplitudes of said control signal.

6. An inverter system as set forth in claim 5, including a plurality of latch gates latched in a first logic condition, a plurality of bias signals, and comparator means in said selecting means comparing said control signal with the respective bias signal to actuate the respective latch gate to a second logic condition.

7. An inverter system as set forth in claim 6, including switching logic means in said selecting means to prevent skipping of frequency ratios in moving from increasing to decreasing ratios and in moving from decreasing to increasing ratios.

8. An inverter system as set forth in claim 1, including a motor energized by the output of said inverter system for operation at a speed determined by the fundamental output frequency of the inverter.

9. An inverter system as set forth in claim 1, wherein said ratio generating means includes a variable frequency clock generating a clock frequency of a predetermined integral multiple of the modulation frequency, and frequency divider means connected to said clock generating a plurality of output signals at frequencies having an integral ratio with respect to the modulation frequency.

10. An inverter system as set forth in claim 9, wherein said frequency divider means includes first and second series of flip-flops scaling down the frequency applied thereto by ratios of 1:2 in a sequence of steps.

11. An inverter system as set forth in claim 9, wherein said frequency divider means includes first and second series of flip-flops scaling down the frequency applied thereto by ratios of 1:2 in a sequence of steps, said first series scaling down said clock frequency by a ratio of 1:2, and said second series scaling down said clock frequency by a ratio of 1:3 on the first sequential step and then ratios of 1:2 thereafter.

12. An inverter system as set forth in claim 1, including ring counter means connected to the output of said ratio generating means to develop a control signal of a three-phase, six-step wave form for basic control of the switching devices in the inverter system.

13. An inverter system as set forth in claim 2, including an integrator in said carrier generator means having a square wave input and generating an isosceles triangular wave output of variable frequency the maximum amplitude of which varies inversely with frequency, means generating a DC reference voltage, constant volts per Hertz means to change the relative value of said carrier generator means output and said reference voltage to maintain a substantially constant volts per Hertz, and comparator means to develop an inverter gating signal upon said output of said carrier generator means exceeding said DC reference voltage.

14. An inverter system as set forth in claim 1, including synchronizing means to establish changing from one frequency ratio to another at a time when the output of said carrier generator means is at zero to minimize current surges in the output of said inverter system.

15. An inverter system as set forth in claim 14, including latch gates in said selecting means, and said synchronizing means establishing a change from one frequency ratio to another at a time when all of said latch gates have a zero output.

16. An inverter system as set forth in claim 15, including ring counter means connected to the output of said ratio generating means, and said synchronizing means having an input from said ring counter means at a frequency equal to said modulation frequency and having a narrow synchronizing pulse output at said modulation frequency.

17. An inverter having switching devices, means to establish a control signal, a first path from said control signal means including means to establish a modulation frequency to control the switching rate of the switching devices in the inverter for the fundamental output frequency of the inverter, a second path from said control signal means including means to establish at least two different carrier frequencies each an integral multiple of the modulation frequency, and means to dynamically change from one carrier frequency to the other in accordance with a change in said control signal while retaining said modulation frequency substantially constant.

18. An inverter as set forth in claim 17, including means to change the relative amplitudes of the carrier and modulation frequencies to control the effective output voltage at said modulation frequency of the inverter.

19. An inverter as set forth in claim 17, including synchronization means to relatively synchronize said modulation frequency and said two carrier frequencies.

20. A pulse width modulated inverter having power switching devices, an output modulation frequency determining means, means to provide a carrier and a modulation frequency, means to compare said carrier and modulation voltages, means to control said power switching devices in accordance with said comparison means, means to change the relative amplitude of carrier frequency to modulation frequency thereby changing pulse width in output waveforms and thus controlling output voltage, and means to change said carrier to modulation frequency ratio while the inverter is supplying power to a load.

21. An inverter as set forth in claim 20, including means to change the relative amplitude of the carrier and modulation frequencies to provide substantially equal output voltage at the modulation frequency before and after the carrier frequency change.

22. An inverter as set forth in claim 20, including control means to synchronize said carrier and modulation frequencies.

23. An inverter as set forth in claim 22, wherein said synchronization means synchronizes said carrier and modulation frequencies at a neutral point of one phase of the output voltage.

24. An inverter as set forth in claim 20, wherein the input power voltage to the inverter is fixed voltage.

25. In a polyphase inverter having switching devices for a polyphase output to a load and a direct current input voltage, polyphase pattern generating means to generate a conduction pattern for the switching devices at a modulation frequency, a carrier frequency generator capable of developing a carrier frequency signal, said carrier frequency being synchronized with the zero crossover point of one of the outputs of the pattern generating means, said carrier frequency being an integral multiple of the modulation frequency, said carrier frequency being changeable to other multiples of the modulation frequency, and means to dynamically change from one carrier ratio to another.

26. An inverter as set forth in claim 25, including synchronizing means to synchronize the carrier and modulation frequencies at a zero crossover point.

27. An inverter as set forth in claim 26, including means to maintain synchronization between the carrier and modulation frequencies by making the carrier ratio change at the zero crossover point.

28. An inverter as set forth in claim 25, including means to change the relative magnitude of the carrier and modulation frequency outputs thereby controlling the switching devices in each phase of the inverter.

29. An inverter as set forth in claim 25, including means to adjust the relative amplitude of the modulation and carrier frequencies at the time of carrier ratio change so that the fundamental component of the inverter output modulation frequency has a minimum variation at the carrier ratio change.